(12) United States Patent
Meyers et al.

(10) Patent No.: US 11,494,856 B2
(45) Date of Patent: Nov. 8, 2022

(54) SYSTEM AND METHOD FOR PROVIDING INFORMATION BASED ON GEOGRAPHIC PARAMETERS

(71) Applicants: Jeffrey S. Meyers, San Diego, CA (US); Kent Mouton, Studio City, CA (US); Barry Schlesinger, Los Angeles, CA (US)

(72) Inventors: Jeffrey S. Meyers, San Diego, CA (US); Kent Mouton, Studio City, CA (US); Barry Schlesinger, Los Angeles, CA (US)

(73) Assignee: Meyers Research, LLC

( * ) Notice: Subject to any disclaimer, the term of this patent is extended or adjusted under 35 U.S.C. 154(b) by 0 days.

(21) Appl. No.: 14/150,089

(22) Filed: Jan. 8, 2014

(65) Prior Publication Data
US 2018/0174253 A1   Jun. 21, 2018

(51) Int. Cl.
*G06Q 30/00*  (2012.01)
*G06Q 50/16*  (2012.01)
*G06Q 30/02*  (2012.01)
*G06Q 30/06*  (2012.01)

(52) U.S. Cl.
CPC ......... *G06Q 50/16* (2013.01); *G06Q 30/0283* (2013.01); *G06Q 30/0623* (2013.01)

(58) Field of Classification Search
CPC ........... G06Q 30/0643; G06Q 30/0205; G06Q 50/16; G06Q 30/0283; G06Q 30/0623; G08G 1/096844; G06F 8/34

USPC .................. 705/7.34, 27.1; 701/414; 715/763
See application file for complete search history.

(56) References Cited

U.S. PATENT DOCUMENTS

| | | | |
|---|---|---|---|
| 2006/0200311 A1* | 9/2006 | Arutunian | G01C 21/00 701/414 |
| 2008/0040678 A1* | 2/2008 | Crump | 715/763 |
| 2009/0076888 A1* | 3/2009 | Oster et al. | 705/10 |
| 2011/0161137 A1* | 6/2011 | Ubalde et al. | 705/7.34 |
| 2011/0193795 A1* | 8/2011 | Seidman | G06F 16/2428 345/173 |
| 2011/0307801 A1* | 12/2011 | Sherman | 715/751 |
| 2012/0197685 A1* | 8/2012 | Mays et al. | 705/7.34 |

OTHER PUBLICATIONS https://wp-tid.zillowstatic.com/49/Figure1-ZillowAndroidRealEstateApp-086139.png (Year: 2013).*

* cited by examiner

*Primary Examiner* — Matthew E Zimmerman
(74) *Attorney, Agent, or Firm* — James A. Italia; Italia IP

(57) ABSTRACT

A method for providing economic information based on geographic parameters that includes providing a map for display on a device, receiving a user-defined area on the map, and providing data relating to the user-defined area. Obtaining the relevant information or data about a particular geographic region frequently involves consulting a plurality of sources. The current method is much more efficient and cost effective to retrieve from fewer sources and provide the information in a quick and easy to comprehend format.

14 Claims, 7 Drawing Sheets

SYSTEM AND METHOD FOR PROVIDING INFORMATION BASED ON GEOGRAPHIC PARAMETERS

CROSS-REFERENCE TO RELATED APPLICATION

This application claims priority under 35 U.S.C. § 119(e) to U.S. Provisional Utility Application Ser. No. 61/859,390 filed Jul. 29, 2013, the contents of which are fully incorporated by this reference.

BACKGROUND OF INVENTION

This application relates generally to relating information or data to geographic regions. More specifically, this application relates systems and methods for providing information based on geographic parameters.

SUMMARY

In purchasing, selling, developing or otherwise making decisions about real estate, it is important to have as much information about the surrounding area as possible. This is because the value of the real estate under consideration depends not only on the characteristics of the real estate itself but also characteristics of the surrounding area (e.g. schools, crime rates, employment rates, property values of neighboring areas, etc.). Obtaining the relevant information or data about a particular geographic region frequently involves consulting a plurality of sources. It would be much more efficient and cost effective to retrieve from fewer sources and provide the information in a quick and easy to comprehend format.

In one embodiment a method for providing economic information based on geographic parameters comprises: providing a map for display on a device; receiving a user-defined area on the map; and providing data relating to the user-defined area.

In another embodiment, a system for providing economic information based on geographic parameters comprised: one or more participant terminals operable to act as a client on a network; a computer operable to act as a server on the network and to communicate with each of the participant terminals over the network, the computer comprising: a memory configured to store a set of instructions; and a processor configured to execute the set of instructions, wherein the set of instructions cause the processor to: provide a map for display on one of the one or more terminals; receive a user-defined area on the map; and provide data relating to the user-defined area.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
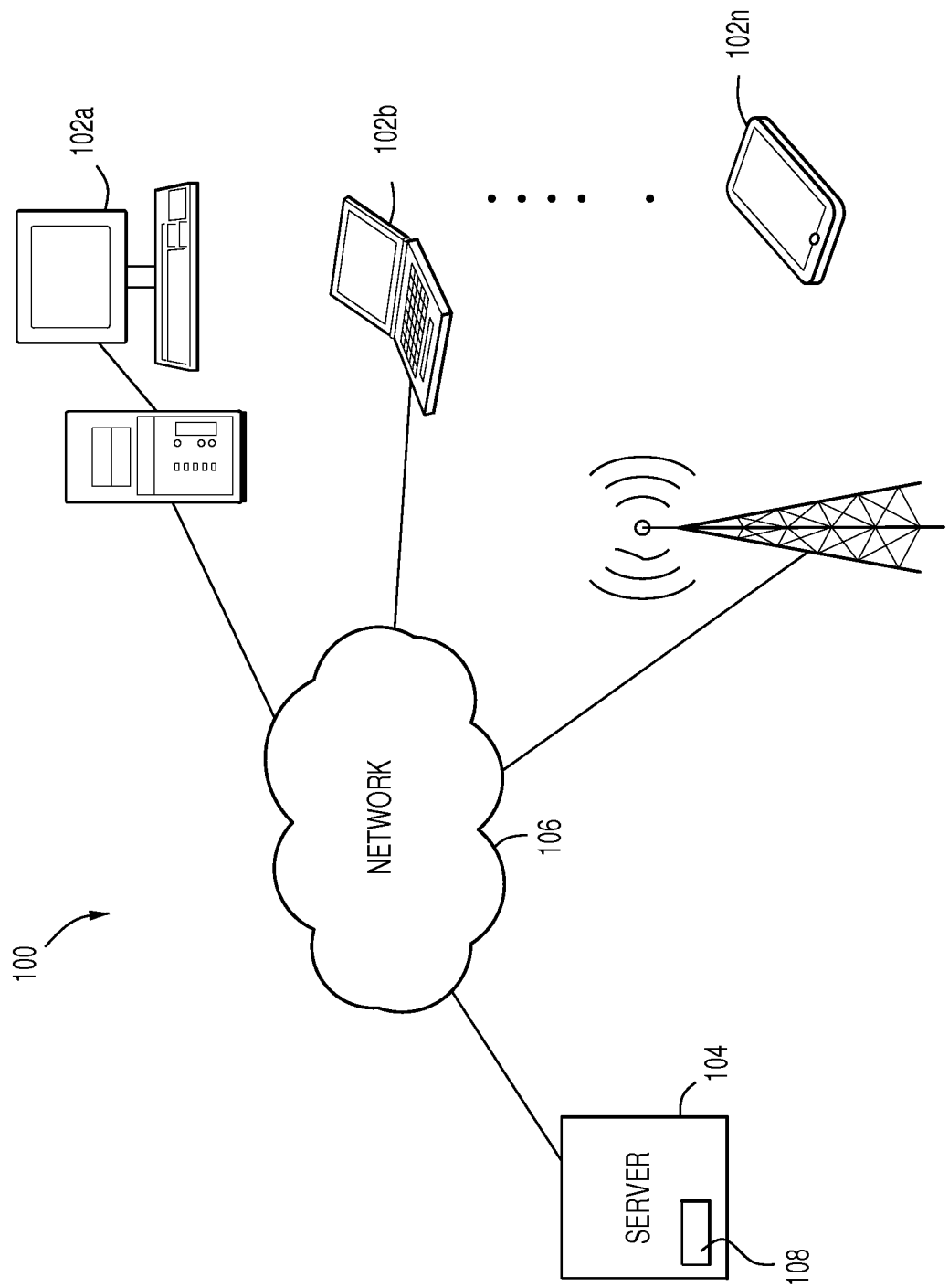
FIG. 1 illustrates a system of the present disclosure.

Referring now to FIG. 1, a system 100 for providing information or data based on geographic parameters is depicted. The system 100 may include one or more terminals 102*a*-102*n* (collectively 102), a server 104, and a communications network 106. The different elements and components of the system 100 may communicate with one another using wireless communications or hardwired connections, such as fiber optics, cable, DSL, telephone lines, and other similar connections.

The communications network 106 may include any number of networks capable of providing communications between the server 104 and terminals 102. For example, the communications network may be one or more, or any combination of, wireless networks, data or packet networks, publicly switched telephone networks (PSTN), etc.

The participant terminals 102 may include any suitable device operable to act as a client on a network. Illustrative terminals 102 include, but are not limited to, personal computers, desktop computers, laptop computers, servers, or any suitable telecommunications device, including, but not limited to, VoIP telephones, smart telephones or wireless devices, such as cellular telephones, personal digital assistants (PDA), communications enabled mp3 players, etc. Each terminal 102 may be configured to transmit and/or receive information to and/or from the server 104 and/or other participant terminals 102.

The server 104 may be any server, computer or device configured to process commands from the participant terminals 102. In the illustrative embodiment, the server 104 includes a memory and a processor to accommodate the following. However, it will be appreciated that the following may be implemented in hardware, software, or a suitable combination of hardware and software, and which can be one or more software systems operating on a general purpose server platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

One or more databases 108 may be in communication with the server 102. The database(s) 108 are configured to store information or data relating to geographic parameters for access by the server 104 and/or terminals 102. Any such suitable information or data may be stored on the one or more databases 108. Illustrative geographic-related information or data includes, without limitation, economic data, community data, sales data, supply data, price data, and distress data. As used herein, economic data includes, without limitation, real GDP, consumer confidence, inflation (core and full), job growth, private job growth, unemployment rate, productivity, jobless claims, 30-year fixed mortgage rate, adjustment mortgage rates, 10 year treasury, housing market/builder sentiment, leading economic indicators, Dow Jones Industrial Average, S&P 500, NASDAQ, S&P Super Homebuilding, public home builder stock, real GSP, jobs by sector, personal income growth, mass layoffs, real county product, top employers, job openings, job density, office absorption, etc. As used herein, community data includes, without limitation, population, household information, home ownership rate, renter households, household income, population by age, debt to income ratio, walkability, school information, crime rates, ethnicity information, etc. As used herein, sales data includes, without limitation, existing home sales, purchase mortgage applications, new home sales, public builder new home orders, mortgage originations, existing home sales, sales by type, foreclosure sales, investor sales, etc. As used herein, supply data includes, without limitation, months of resale inventory, months of new home inventory, total building permits, E/P ratio, total housing starts, housing vacancies, days on market, number of listings, months of inventory, etc. As used herein, price information includes, without limitation, existing home prices, resale affordability, new home prices, new home affordability, Case Shiller Index, prices by type, prices to rent, etc. As used herein, distress data includes, without limitation, number of foreclosures, % of loans in foreclosure, mortgage delinquencies, foreclosure sales, notices of default, etc. The one or more databases may include any of the geographic-related data a various geographic levels. For example, without limitation, suitable geographic levels may include national, state, province, county, city, zip code, site, etc. It will be appreciated that the database may include any suitable information and that the forgoing is illustrative only and not to be construed as limiting in any way.

Figure 2:
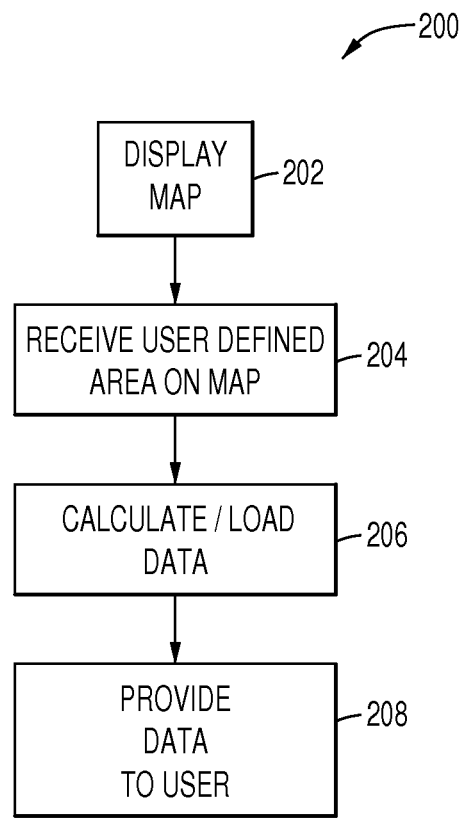
FIG. 2 illustrates a method of the present disclosure.
Figure 3:
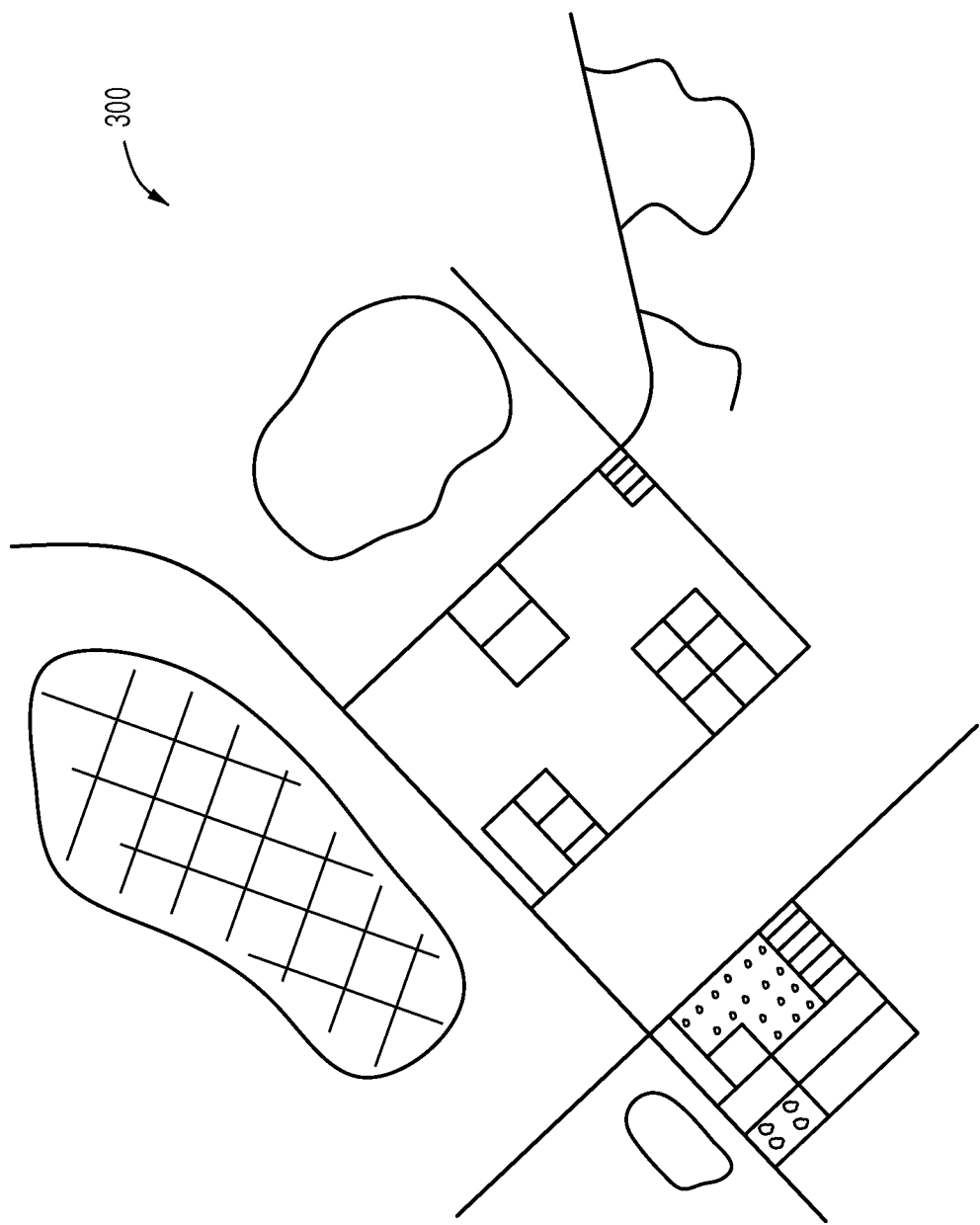
FIG. 3 is an illustrative map.

Referring now to FIG. 2, a method 200 for providing information or data based on geographic parameters is depicted. First, a map is provided to a user device or terminal [step 202]. FIG. 3 is a non-limiting illustrative example of a such a map 300. The map 300 may be at any suitable level (e.g. global, national, state, county, city, zip code, user-defined, etc.). Also, the map may be manipulated by a user such that the user may zoom-in on portions of the map or, alternatively, zoom out of portions of the map such that a user may identify the appropriate level of the map and locate a desired position on the map.

Figure 4:
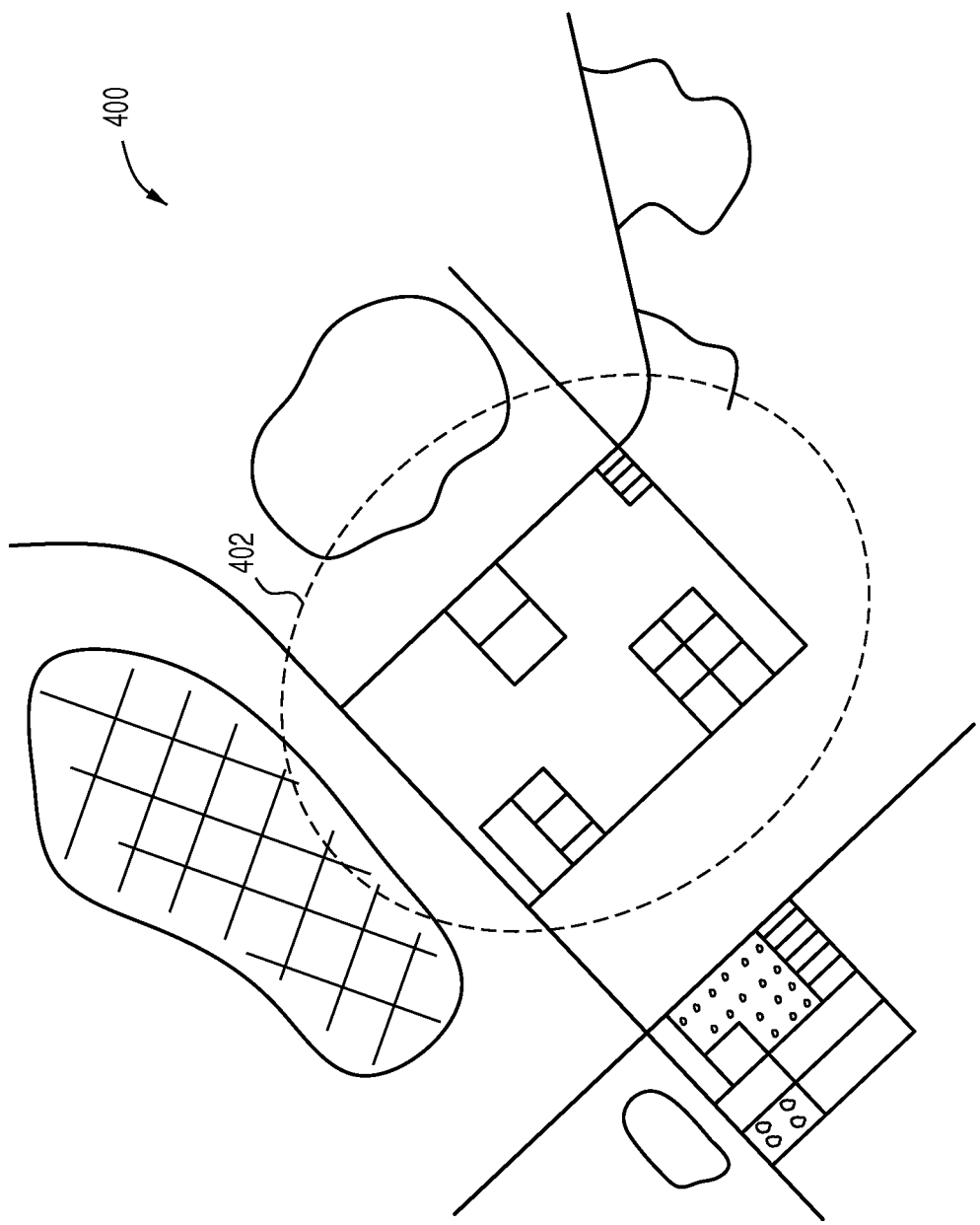
FIG. 4 is an illustrative map having a user-defined area therein.

Next, a user-defined area on the map is received [step 204]. FIG. 4 is a non-limiting illustrative example of a user-defined area 402 on a map 400. A user may define the area on the map in any suitable way. For example, and without limitation, a map may be displayed on a user's device/terminal which has a touch screen and the user may outline the user-defined area on the map with the user's finger. However, it will be appreciated that any suitable input means may be employed including, without limitation, by way of a stylus on a touchscreen, stylus on a touchpad, a computer mouse or touchpad, a keyboard, inputting GPS coordinates via any suitable means, inputting latitude and longitude coordinates via any suitable means, or any other suitable means for communicating data by way of and to any suitable data processing or data handling device.

Information or data relative to the user-defined area may then be loaded, retrieved or calculated [step 206]. In one non-limiting example, since the user-defined area may include one or more traditional geographic regions (e.g. national, state, county, city, zip, etc.), or portions thereof, it may be necessary to compile and mathematically manipulate (e.g. average, median, etc.) the data for those regions so as to provide a more comprehensive result set. It will be appreciated that such calculating is optional and embodiments without such calculations are contemplated and encompassed herein. The information or data may be strictly related to the user-defined area or may also include data relevant to a larger geographic area in which the user-defined area resides. For example and without limitation, if the user-defined area is a region within defined city limits, relevant data may include not only data specific to the user-defined area within the city but also any other larger geographic region in which the user-defined area resides—zip code, city, county, state, national, etc. This may, for example, allow the user to understand the information or data relative to the user-defined region in a greater context (e.g. a comparison of the unemployment rate within the user-defined area to the state or national average, etc.). The type of data loaded, retrieved or calculated may be predetermined by the user prior to defining an area on the map, may be selected by the user after the user-defined area placed on the map, predetermined by the system or an administrator, or at any other suitable time.

Figure 5:
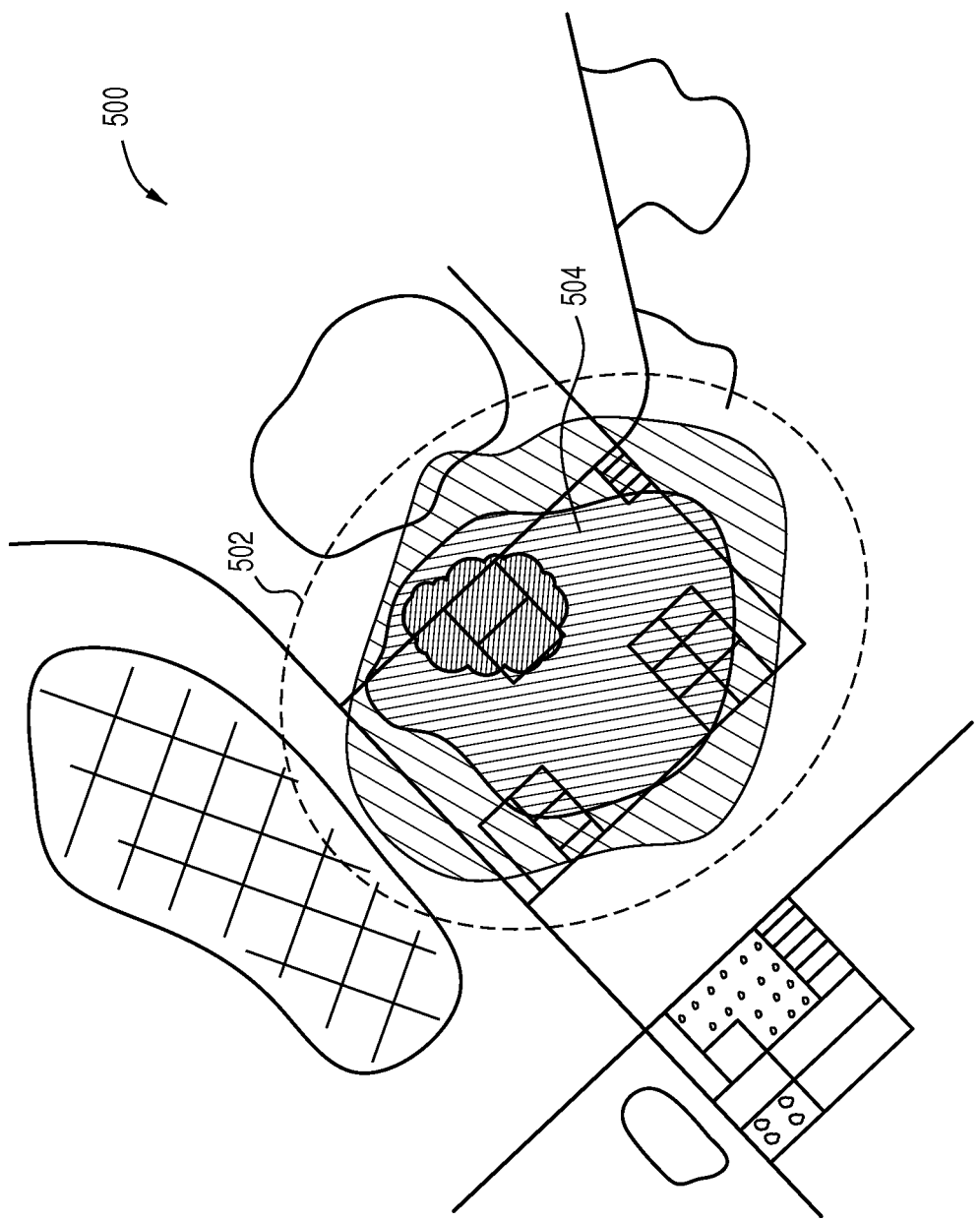
FIG. 5 is an illustrative map having an overlaying intensity map within a user-defined area.
Figure 7:
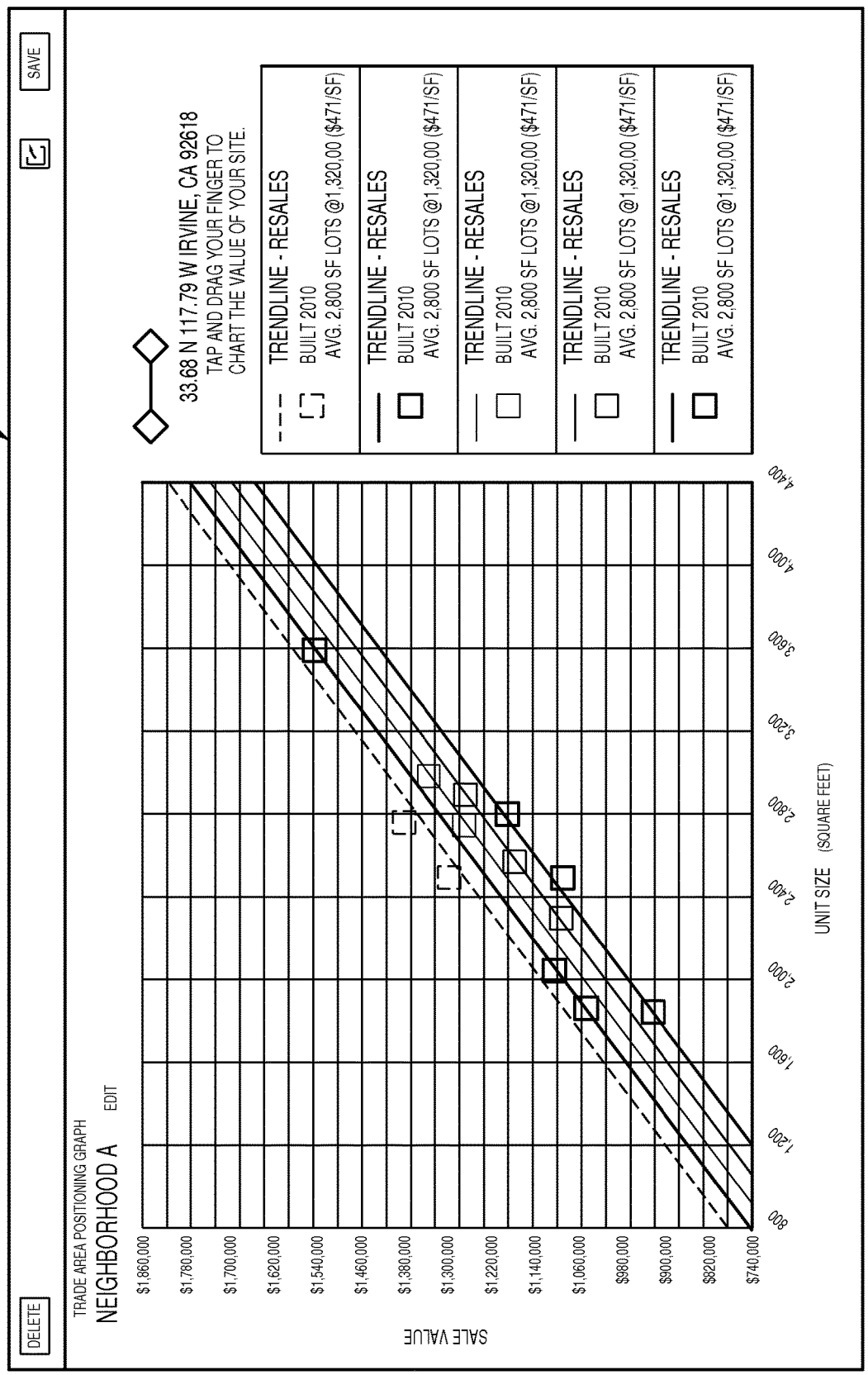
FIG. 7 is an illustrative graph displaying information about a user-defined area of a map.

The data may then be provided to the user [step 208]. The data may be provided to the user via any suitable means or in any suitable form. For example, the data may be provided in the form chart(s), graph(s), table(s), spreadsheet(s), downloadable files, or any combination thereof. FIG. 7 shows a non-limiting example of illustrative graph 800 displaying data relevant to the user-defined area. Additionally, any portion of the data may be displayed on or overlayed with the map. For example, FIG. 5 illustrates data displayed as an intensity map 504 overlaying the map 500 and within the user-defined area 502. It will be understood an intensity map is a map that displays the weight, value, frequency, or any other metric of one portion of the map relative to other adjacent portion(s) where the relative values may be displayed as numerical values, various color or shading scheme or by any other suitable means. Also, as used herein, the term "overlay" refers to additional data being provided on the map and is to be understood broadly and is not limited to encompassing a first map being placed atop or adjacent a second map.

Figure 6:
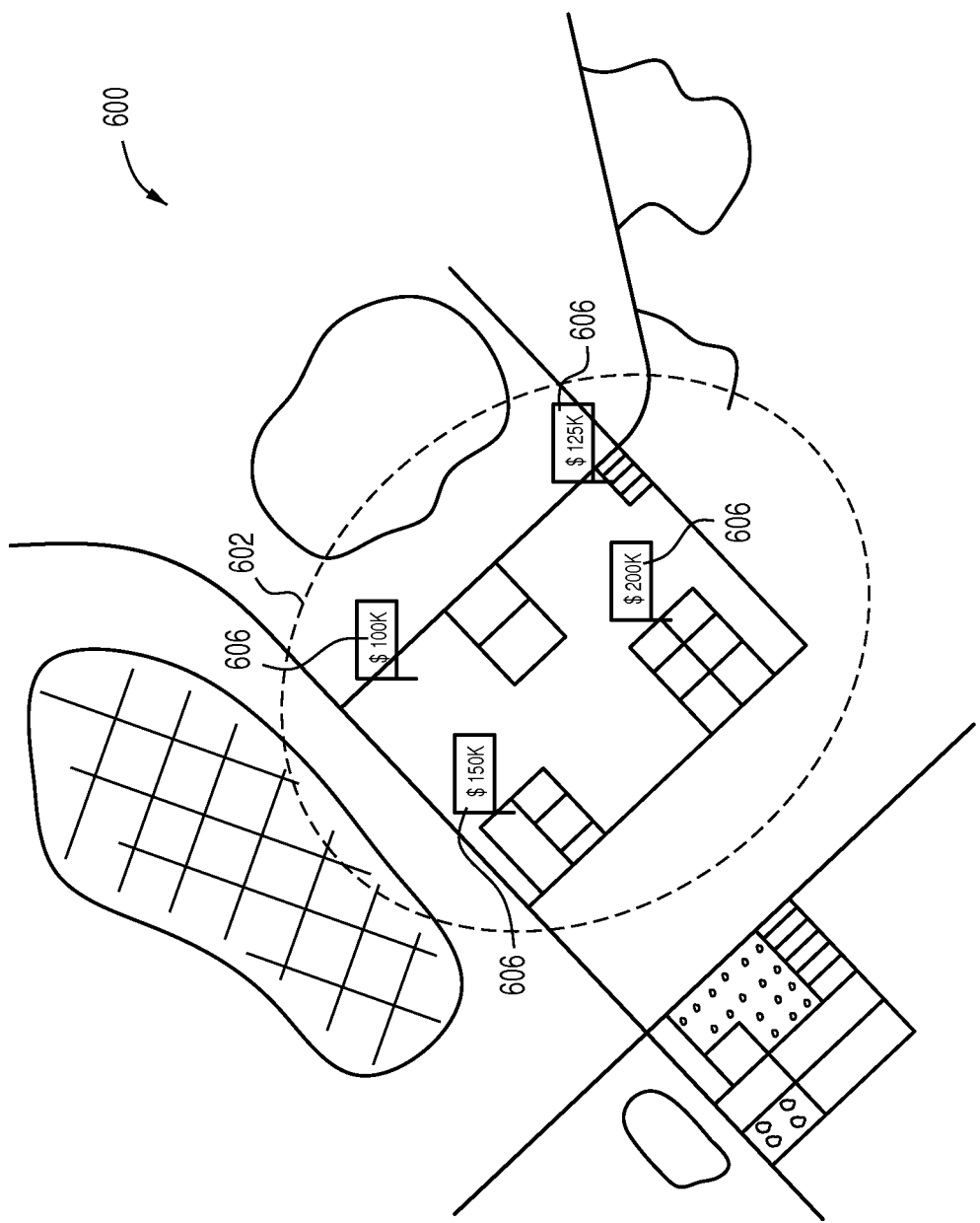
FIG. 6 is an illustrative map having a plurality of flags within a user-defined area.

In another example, FIG. 6 illustrates one or more "flags" 606 (including data therein) within the user-defined area 602 of the map 600. It will be appreciated that the forgoing include examples for illustrative purposes and that the information or data may be provided to the user in any suitable form or combination and remain within the scope of the present disclosure. Once the data has been provided to the user, the method may be complete or the user may load another map and/or define another area within the map.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A method for providing economic information based on geographic parameters, utilizing a computing device that includes a touch-activated display, comprising:
   providing a map for display on said computing device;
   prior to receiving a first data parameter from a user, defining a first user-defined area on the map, wherein the first user-defined area is an arbitrarily closed area defined by user input on said touch-activated display; and
   receiving a first user data parameter from a user to initiate providing a first data within the first user-defined area on the map; and providing the first data relating to the first user data parameter in the user-defined area selected by the user, wherein the user data parameter is selected from the group consisting of economic data, community data, sales data, supply data, price data, and distress data; and generating a plurality of flags in the first user-defined area on the map, wherein each flag in the plurality of flags contains a respective dollar amount; and receiving a second user data parameter, from a user to initiate providing a second data within the first user-defined area on the map; and providing the second data relating to the second user data parameter, wherein the user data parameter is selected from the group consisting of economic data, community data, sales data, supply data, price data, and distress data, and wherein the user was provided with the first data and the second data without the user having to redefine said first user-defined area on the map, wherein the second data is in the form of one or more of a chart, graph, table, and spreadsheet, and is provided without the map being visible.

2. The method of claim 1 further comprising providing the first data in the form of one or more of an other chart, graph, table, and spreadsheet.

3. The method of claim 2, wherein first data is the other graph including an X and Y axis.

4. The method of claim 1 further comprising the step defining a second user-defined area on the map, wherein the second user-defined area is a larger geographic area that includes the first user-defined area and wherein said first data and said second data are provided for said second user-defined area.

5. The method of claim 4 wherein the second user-defined area is selected from the group consisting of zip code, city, county, state, and nation.

6. The method of claim 1 wherein the step of providing the first data relating to the user-defined area comprises displaying the first data relating to the first user-defined area on the map, and wherein the first data is displayed within the first user-defined area on the map.

7. The method of claim 6 wherein the first data is displayed as an intensity map overlaying the map.

8. A system for providing economic information based on geographic parameters comprising:

one or more participant terminals operable to act as a client on a network;

a computer operable to act as a server on the network and to communicate with each of the participant terminals over the network, the computer comprising:

a memory configured to store a set of instructions; and a processor configured to execute the set of instructions, wherein the set of instructions cause the processor to:

provide a map for display on one of the one or more terminals;

prior to receiving a first user data parameter, define a first user-defined area on the map, wherein the first user-defined area is an arbitrarily closed area defined by user tactile input on said touch-activated display;

receive a first data parameter from a user to initiate providing a first data within the first user-defined area on the map; and provide the first data relating to the first parameter in the user-defined area selected by the user, wherein the user data parameter is selected from the group consisting of economic data, community data, sales data, supply data, price data, and distress data;

generate a plurality of flags in the first user-defined area on the map, wherein each flag in the plurality of flags contains a respective dollar amount;

receive a second user data parameter, from a user to initiate providing a second data within the first user-defined area on the map;

provide the second data relating to the second user data parameter, wherein the user data parameter is selected from the group consisting of economic data, community data, sales data, supply data, price data, and distress data, and wherein the user is provided with the first data and the second data without the user having to redefine said first user-defined area on the map, wherein the second data is in the form of one or more of a chart, graph, table, and spreadsheet, and is provided without the map being visible.

9. The system of claim 8, wherein the set of instructions cause the processor to provide the first data in the form of one or more of an other chart, graph, table, and spreadsheet.

10. The system of claim 9, wherein first data is the other graph including an X and Y axis.

11. The system of claim 8, wherein the set of instructions cause the processor to further define a second user-defined area on the map, wherein the second user-defined area is a larger geographic area that includes the first user-defined area and wherein said first data and said second data are provided for said second user-defined area.

12. The system of claim 11 wherein the second user-defined area is selected from the group consisting of zip code, city, county, state, and nation.

13. The system of claim 8 wherein said user tactile input is by a user's finger.

14. The system of claim 8 wherein said user tactile input is by a stylus.

* * * * *